(12) United States Patent
Daniel-Ivad

(10) Patent No.: US 7,718,305 B2
(45) Date of Patent: May 18, 2010

(54) RECHARGEABLE ALKALINE MANGANESE CELL WITH CATHODE CONSISTENCY COMPENSATION

(75) Inventor: Josef Daniel-Ivad, Newmarket (CA)

(73) Assignee: Pure Energy Visions Inc. (CA)

( * ) Notice: Subject to any disclaimer, the term of this patent is extended or adjusted under 35 U.S.C. 154(b) by 1514 days.

(21) Appl. No.: 10/980,175

(22) Filed: Nov. 4, 2004

(65) Prior Publication Data

US 2005/0164076 A1    Jul. 28, 2005

Related U.S. Application Data

(60) Provisional application No. 60/537,900, filed on Jan. 22, 2004.

(30) Foreign Application Priority Data

Nov. 1, 2004    (CA) .................................. 2486488

(51) Int. Cl.
- *H01M 4/02* (2006.01)
- *H01M 4/46* (2006.01)
- *H01M 4/52* (2006.01)

(52) U.S. Cl. .................. 429/49; 429/209; 429/218.1; 429/224

(58) Field of Classification Search ............... None
See application file for complete search history.

(56) References Cited

U.S. PATENT DOCUMENTS

| | | | |
|---|---|---|---|
| 4,081,397 A * | 3/1978 | Booe ........................ 252/194 |
| 5,424,145 A | 6/1995 | Tomantschger et al. |
| 5,474,858 A * | 12/1995 | Merritt ........................ 429/57 |
| 5,789,102 A * | 8/1998 | Jacus et al. ................ 429/141 |
| 6,361,899 B1 * | 3/2002 | Daniel-Ivad et al. ........ 429/224 |
| 6,451,486 B1 * | 9/2002 | Davis et al. ................ 429/232 |
| 6,548,208 B1 | 4/2003 | Kasamatsu et al. |
| 6,551,744 B1 | 4/2003 | Ohzuku et al. |
| 6,855,441 B1 * | 2/2005 | Levanon ........................ 429/7 |
| 2006/0121340 A1 * | 6/2006 | Kawai et al. ................ 429/142 |

FOREIGN PATENT DOCUMENTS

| | | |
|---|---|---|
| CA | 2441224 | 9/2002 |
| CA | 2389907 | 12/2003 |
| EP | 0 617 845 B1 | 7/1996 |
| WO | WO 94/24718 | 10/1994 |
| WO | WO 2004/025756 * | 3/2004 |

OTHER PUBLICATIONS

"Coathylene® In Dry Cell Batteries", Herberts Polymer Powders SA, Jul. 1999: Bulle, Switzerland.

"Precipitated LDPE fine powders as binders in the manufacture of dry cell batteries", Herberts Polymer Powders SA, Nov. 1998: Bulle, Switzerland.

* cited by examiner

*Primary Examiner*—Patrick Ryan
*Assistant Examiner*—Alix Echelmeyer
(74) *Attorney, Agent, or Firm*—Brunet & Co. Ltd.

(57) ABSTRACT

In an improved rechargeable alkaline manganese cell that has a manganese dioxide cathode comprising pellets formed by pressing a cathode powder blend comprising a hygroscopic additive for increasing cumulative capacity, the sticky consistency of the pellets, which is un-desirable for continuous automated production is compensated for by the addition of up to 0.5% of a hydrophobic binder. This small amount leaves the cell performance substantially unimpaired, but provides the desired consistency for large-scale production. Further disclosed is an improved charge methodology for a rechargeable alkaline manganese cell wherein the charge current is pulsed at a voltage in excess of 1.65 V and the no-load cell voltage response is monitored at predetermined intervals. No charge current pulse is permitted to pass through the cell if the no-load voltage exceeds a threshold value. This results in increased utilization of the capacity of the cell while reducing the likelihood of damage to the cell due to overcharging.

8 Claims, No Drawings

RECHARGEABLE ALKALINE MANGANESE CELL WITH CATHODE CONSISTENCY COMPENSATION

CROSS-REFERENCE TO RELATED APPLICATIONS

This application claims the benefit of U.S. patent application 60/537,900, filed Jan. 22, 2004.

FIELD OF THE INVENTION

The invention relates to rechargeable alkaline batteries. Specifically, the invention relates to cathode formulations of such batteries that comprise a hydrophobic cathode additive for affecting the consistency of pressed cathode pellets to make them more amenable to continuous production. The invention also relates to an improved charging method for use with rechargeable alkaline manganese cells, particularly the cells of the present invention.

BACKGROUND OF THE INVENTION

Alkaline battery technology has been used since the 1970's to provide inexpensive, long-lasting portable power sources for a variety of electrical applications. Disposable alkaline batteries, or primary cells are the most common example. However, due to recent technical advancements, re-chargeable alkaline batteries, or secondary cells, have recently become available. These batteries are significantly less expensive for the end-user and are also more environmentally benign. In order to avoid gas production during recharging that could lead to dangerous internal overpressure and cell leakage, the chemistry of rechargeable alkaline batteries is significantly different from primary alkaline batteries. In order that rechargeable alkaline batteries are indistinguishable from primary alkaline batteries from a consumer's point of view, improvements need to be made to the cathode that result in improved electrical performance and that allow the batteries to be produced on conventional large-scale automated production equipment.

The cathode composition of primary alkaline batteries often comprises a binder that has the main task of increasing the flexural strength of the pressed cathode. Without the addition of sufficient binder (typically about 1.0-2.0% by weight) excessive pellet breakage occurs during automated production. The addition of a binder has an adverse impact on cell performance; since binders are electrochemically inactive, the presence of the binder reduces the quantity of active cathode components, such as manganese dioxide, that are available to participate in electrochemical reactions. Also, binders are typically non-conductive. The addition of a binder is therefore tolerated in primary alkaline batteries only because of its necessity for economic large-scale battery production.

There are many suitable binder materials. One such binder material is polyethylene powder, particularly the polyethylene powder manufactured under the trade name Coathylene® by the Swiss firm Herberts Polymer Powders SA ("Herberts"). In July, 1999, Herberts published a study entitled: "Coathylene® in Dry Cell Batteries", and in November, 1998, another publication entitled: "Precipitated LDPE fine powders as binders in the manufacture of dry cell batteries". These publications describe several advantages of Coathylene® powder when used in the cathode composition of a primary alkaline battery, such as: increased cathode strength, decreased mechanical friction, no significant decrease in conductivity, etc. These advantages are present when the binder material is added in a concentration of at least 1.0% and preferably 1.5 to 2.0% relative to the cathode mass. Lower concentration is not effective in achieving the aforementioned advantages.

Recent improvements in the chemistry of rechargeable alkaline battery cathode formulations have resulted in a desirable increase in cumulative discharge capacity, cycle life, and discharge current.

One example of an improved cathode formulation is disclosed in European patent EP0617845 B1, by Taucher, et al. Taucher discloses a rechargeable alkaline cell with barium compounds such as $BaO$, $Ba(OH)_2 * 8H_2O$ and $BaSO_4$ added to the cathode mix in the range of 3-25%. These barium compounds provide improved cumulative capacity, but also improve the flexural strength of the cathode, obviating the need for the addition of a binder. The addition of a binder to these cells is undesirable, since the presence of the binder reduces cell performance.

Another example of an improved cathode formulation is disclosed in U.S. Pat. No. 6,361,899, by Daniel-Ivad, et al., which is hereby incorporated by reference for jurisdictions that permit this method. Daniel-Ivad discloses a rechargeable alkaline cell in which the cathode includes hygroscopic additive compounds comprising oxides, hydroxides, or hydrates of barium or strontium. These hygroscopic additives desirably increase the performance of the cell, as indicated by increases in the cumulative discharge capacity and cycle life of the cell.

While both of the foregoing references disclose the use of certain barium compounds to improve cumulative cell capacity of rechargeable alkaline cells, neither reference contemplates continuous cell production nor addresses any of the issues that arise in a continuous production environment. In fact, when barium compounds such as $BaO$ or $Ba(OH)_2 * 8H_2O$ are used as additives, the formed pellets exhibit a "sticky" consistency that impedes continuous processing. As a result, the improved cathode formulations cannot be used in a continuous production environment, making batteries with these formulations too expensive for the end-user. Although binders are used to increase flexural strength of the cathode as an aid in continuous pellet processing, binders are not normally selected to modify the consistency of the cathode pellet. In fact, "stickiness" is not a problem for primary alkaline batteries, as the cathode pellets in these cells do not contain hygroscopic additives.

Accordingly, there is still a need for an improved rechargeable alkaline battery cathode composition that results in increased battery performance while permitting manufacturing in a continuous production environment.

Rechargeable alkaline cells are prone to cell failures when overcharging takes place. Overcharge results in damage to cell components and will cause increased internal gassing, which in turn may eventually cause the cell to fail from electrolyte leakage due to overpressure. The critical voltage limit above which damage can occur is reported at 1.68V in the literature (D. Linden, Handbook of Batteries, $2^{nd}$ Edition, Mc-Graw Hill, N.Y., 1995). Typically, commercial chargers are voltage limited at about 1.65V, which is the generally accepted safe value for rechargeable alkaline cells. However, a portion of the cell's capacity is not re-charged, which results in a loss of available performance. The loss of available performance is especially significant when inert materials such as additives or binders are added to the cathode, as the presence of these materials reduces the amount of active cathode component available for electrochemical reaction.

The need therefore exists for an improved charging method for rechargeable alkaline cells, particularly cells containing additives and binders.

SUMMARY OF THE INVENTION

In one aspect of the invention, there is provided a rechargeable alkaline manganese cell comprising a cathode pellet formed from a homogeneous blend of: a cathode powder comprising manganese dioxide; a hygroscopic additive powder comprising oxides, hydroxides, or hydrates of barium or strontium; and, a hydrophobic binder for altering consistency of the pellet, the hydrophobic binder in an amount of less than 0.5% by weight of the cathode.

The present invention advantageously provides a cathode with an acceptable consistency when pressed and formed into a cathode pellet, without noticeably decreasing the electrical performance of the cells made using the pellet.

It has been discovered that a small amount of a hydrophobic binder material can compensate for the aforementioned consistency problem in cathode pellets of rechargeable alkaline manganese cells containing hygroscopic additives. The hydrophobic binder is preferably added in an amount greater than zero and less than 0.5% by weight of the cathode, more preferably in an amount of from 0.001% to 0.4% by weight of the cathode, even more preferably in an amount of from 0.01% to 0.25% by weight of the cathode, still more preferably in an amount of from about 0.1% to about 0.2% by weight of the cathode. This amount is normally too small for performing a binder function as is conventionally understood in the art.

Surprisingly, the addition of a hydrophobic binder in this amount does not appreciably decrease the electrical performance of the cells (cumulative cell capacity, cycle life, and discharge current) and, in some cases, may even result in a slight performance increase.

The hydrophobic binder may be a polyethylene material (for example, Coathylene®), a polytetrafluoroethylene material (for example, Teflon®), or a metal salt of a fatty acid (for example, calcium stearate, magnesium stearate or zinc stearate). Preferably, the hydrophobic binder is provided in a powdered form with a particle size less than 75 µm, preferably between 10-20 µm. More preferably, the hydrophobic binder is a powdered polyethylene material comprising Coathylene® powder. Even more preferably, the hydrophobic binder is a powdered material comprising calcium stearate.

In another aspect of the invention, there is provided a method of charging a rechargeable alkaline manganese cell comprising the steps of: applying a first charge voltage in excess of 1.65 V to the cell at a charge frequency, resulting in a series of current pulses; applying no charge voltage to the cell for a pre-determined time interval following each current pulse; measuring a no-load voltage of the cell at a measurement frequency offset from the charge frequency by the pre-determined time interval; comparing the no-load voltage to the first charge voltage; and, when the no-load voltage exceeds the first charge voltage, skipping the next subsequent current pulse.

The charge methodology of the present invention advantageously results in increased charging efficiency and cumulative cell capacity of rechargeable alkaline cells in a safe and automatable manner. Approximately a 15% increase in cell capacity may be obtained. A current pulse may be permitted to pass through the cell only if the no-load voltage does not exceed the first charge voltage to prevent damage to the cell through overcharging. The first charge voltage may be 1.75 V.

The current pulse may have a duration of 14.5 seconds. The pre-determined time interval may be 0.5 seconds.

In another embodiment, the method may further comprise: counting the number of skipped current pulses; when the number of skipped pulses is greater than or equal to a first pulse-skip value, comparing the no-load voltage to a second charge voltage; skipping each subsequent current pulse until the no-load voltage is less than the second charge voltage; followed by, when the no-load voltage exceeds the second charge voltage, skipping the next subsequent current pulse. The second charge voltage may be 1.70 V and the first pulse-skip value may be 6 current pulses.

The method may yet further comprise: when the number of skipped current pulses is greater than or equal to a second pulse-skip value, comparing the no-load voltage to a third charge voltage; skipping each subsequent pulse until the no-load voltage is less than the third charge voltage; followed by, when the no-load voltage exceeds the third charge voltage, skipping the next subsequent current pulse. The third charge voltage may be 1.65 V and the second pulse-skip value may be 24 current pulses.

An automated charger may also be provided for practicing the method according to the present invention.

DESCRIPTION OF THE PREFERRED EMBODIMENTS

Production Efficiency

Pellets sized for AA rechargeable alkaline manganese dioxide cells were produced substantially as described in Example 1 of previously cited U.S. Pat. No. 6,361,899. The hygroscopic additive barium hydrate ($Ba(OH)_2 \cdot 8H_2O$) was used in making the cathode blend instead of barium sulphate, as described. Cathode pellets were made by pure pressing of the mixed components (i.e. no binder material was used) and the consistency of the pellets was sticky. In one embodiment, the invention provides a rechargeable electrochemical cell comprising a manganese dioxide cathode, a separator, an anode and an aqueous alkaline electrolyte.

In pellets made according to the present invention, the same procedure was followed as for control cells, with the addition of a hydrophobic binder comprising the polyethylene powder Coathylene® type HA1681 in an amount of about 0.1%, 0.15% and 0.2% by weight relative to the cathode mass. The consistency of the cathode pellets obtained from these mixes did not exhibit the sticky consistency of the control cells.

A pellet consolidation machine (provided by Hibar Systems Ltd. of Richmond Hill, Canada) was used for continuous production trials with both types of pellets at cell production speeds of 200 cells/min. Three pellets were used in each cell, resulting in a pellet feed rate of 600 pellets/min. The control cathode pellets with a sticky consistency resulted in blockages inside the pellet infeed tracks. Blockages caused stoppage of the automated equipment until an operator was able to clear the blockage to resume production. This caused a significant reduction in production throughput. The production speed of 200 cells/min could not be maintained continuously. The loss in production efficiency depends on the number of blockages and the time it takes the operator to clear each blockage. At an average rate of 10 blockages per hour, and an average time of 60 seconds to clear and resume production for each blockage, a loss in production efficiency of approximately 17% was observed with the control pellets. No corresponding pellet blockages (or resultant efficiency loss) was observed for the pellets made according to the invention during a timed continuous run of 2 hours. A comparison of the production efficiency for the control pellets (made according to the prior art) and pellets with a hydrophobic binder made according to the present invention is provided in Table 1.

TABLE 1

Production Efficiency Comparison

|  | Control | Invention | | |
|---|---|---|---|---|
| Coathylene ® HA1681 | 0.00% | 0.10% | 0.15% | 0.20% |
| No. of blockages per hour | 10 | 0 | 0 | 0 |
| Loss in efficiency | 17% | 0% | 0% | 0% |

Table 1 above illustrates that, surprisingly, only small amounts of the hydrophobic binder are required in the cathode blend to overcome the problem of pellet blockages and efficiency loss during continuous production.

Discharge Capacity

From an electrochemical point-of-view, the addition of a hydrophobic binder to the cathode is counter-intuitive. The addition of an 'inactive' material (polyethylene is does not participate in the electrochemical reaction and is non-conductive) reduces the amount of 'active' material available and also the conductivity of the cathode mix. It is worth noting that polyethylene powder has a specific density of about 0.916 g/mL vs. 4.29 g/mL for electrolytic manganese dioxide; hence, the addition of 1% polyethylene powder by weight replaces 4.7% of the pellet volume with a non-conductive material. As a result, an increasing amount of polyethylene powder will decrease the available discharge capacity in the cell.

For cells according to the present invention with the polyethylene powder Coathylene® used as the hydrophobic binder, the effect of polyethylene powder addition on discharge capacity loss is illustrated in Table 2. The loss of theoretical capacity is calculated for pellets with increasing Coathylene® content on the basis that Coathylene® is replacing electrolytic manganese dioxide in the cathode mix. The remaining 'free air' or porosity in the pellets is assumed constant; this causes the apparent density of the pellets to decrease with increasing polyethylene content. AA cells were made with the pellets from these cathode mixes and discharge capacity was measured through a 10-ohm resistive load to a cut-off voltage of 0.9V. For the very high Coathylene® addition levels of 1.5% and 2.0% no cells were made, as these high levels already exhibited a theoretical capacity loss that was too high for practical consideration.

TABLE 2

Discharge Capacity As A Function of Polyethylene Content

| Coathylene ® HA1681 | 0.0% | 0.1% | 0.2% | 0.4% | 1.0% | 1.5% | 2.0% |
|---|---|---|---|---|---|---|---|
| Loss of theoretical capacity | 0.0% | −0.4% | −0.8% | −1.7% | −4.2% | −6.4% | −8.4% |
| Relative Initial discharge capacity on 10-ohm load to 0.9 V | 0% | 0% | +3% | −4% | −7% | Not tested | Not tested |

As can be seen form Table 2, the cells with 0.1% and 0.2% Coathylene® performed essentially similar to the control cells without any Coathylene® addition. At 0.4% and 1.0% addition, the actual loss was higher than the theoretical loss, which can most likely be attributed to the addition of the non-conductive binder to the cathode pellets. It is surprising to note that the addition of 0.1% to 0.2% polyethylene, a level that is considered in the literature to provide no binder functions, performed at least equal to or slightly better than the control.

Cell Re-Charging

In order to charge more of the available capacity of the cell, a voltage in excess of the accepted maximum of 1.65 V is applied. To avoid damage to the cell due to overcharging, the voltage is applied in discrete pulses at a certain charge frequency. Depending on the duration of the pulse, the pulses may alternatively more closely resemble a step-function. The no-load cell voltage response is measured at a measurement frequency that is normally equal to the charge frequency, but offset therefrom by a time interval. The time interval is selected so that a period of no-load occurs after a charge pulse that is suitable to allow a steady-state no-load voltage measurement to be taken. When the no-load voltage measurement is greater than or equal to the charging voltage threshold, the next subsequent charge pulse is skipped. When a desired pre-determined pulse to no-pulse ratio is obtained, the charging voltage may be adjusted. The charge frequency, pulse duration, or offset interval may also be adjusted.

In a first embodiment, a charge current of 300-350 mA is applied. The charge frequency is one pulse every 15 seconds having a duration of 14.5 seconds, or 4 pulses/minute. The measurement frequency is equal to the charge frequency (4 measurements/minute), but offset by a no-load time interval of 0.5 seconds from each charge pulse. In a first charging phase, the first threshold voltage is 1.75 V. When the no-load voltage is equal to or greater than the first threshold voltage, the next subsequent pulse in the series of pulses defined by the charging frequency is skipped. The next measurement is taken at the usual time, as if the pulse had not been skipped. When the ratio of pulses to skipped pulses is 1:6, the first charging phase ends. Normally, the ratio of 1:6 is attained when six skipped pulses are counted consecutively.

The charging method may utilize any number of discrete charging phases. In a second embodiment there are two charging phases and in a third embodiment there are three charging phases.

In the second embodiment, the first charging phase is as described above for the first embodiment and the second charging phase begins immediately after the first charging phase ends. At the beginning of the second charging phase, pulses are skipped until the no-load voltage is less than or equal to the second threshold voltage of 1.70 V. Pulses of 300-350 mA are then applied at the second threshold voltage. When the measured no-load voltage exceeds the second threshold voltage, the next subsequent pulse in the charge cycle is skipped. When 24 consecutive skipped pulses are counted, the second charging phase ends.

In the third embodiment, the first and second charging phases are as described above for the first and second embodiments. The third charging phase begins immediately after the second charging phase ends. At the beginning of the third charging phase, pulses are skipped until the no-load voltage is less than or equal to the third threshold voltage of 1.65 V. Pulses of 300-350 mA are then applied at the third threshold voltage. When the measured no-load voltage exceeds the second threshold voltage, the next subsequent pulse in the charge cycle is skipped. Pulse skipping is permitted to continue indefinitely until the batteries are removed from the charging device used to apply the method or until a pre-set time limit is reached (for example, 24 hours).

An automated charger can be programmed to apply the charging method. The automated charger preferably utilizes a micro-controller for implementing the method. The values for the various parameters of the method may be fixed or may be user adjustable. Parameters that have been found suitable are as follows:
1. initial charge current per cell of 300 to 350 mA
2. charging and monitoring frequency of 4 per minute
3. no-load time interval for voltage response measurements of 0.5 seconds after each pulse
4. charge phase 1 at a no-load voltage limit of 1.75V
   a) apply charge current for 14.5 seconds duration until no-load voltage response at the 0.5 second no-load measurement point exceeds 1.75V
   b) start skipping charge pulses if no-load voltage response is above 1.75V
   c) allow charge pulse if no-load voltage response is below 1.75V
   d) continue pulse skipping until pulse to no pulse ratio is 1 to 6 (6 skipped pulses)
   e) commence charge phase 2
5. charge phase 2 at a no-load voltage limit of 1.70V
   a) rest at no-load until no-load voltage response is below 1.70V
   b) allow charge pulse if no-load voltage response is below 1.70V, skip pulse if above
   c) continue pulse skipping until pulse to no pulse ratio is 1 to 24 (24 skipped pulses)
   d) commence charge phase 3
6. charge phase 3 at a no-load voltage limit of 1.65V
   a) rest at no-load until no-load voltage response is below 1.65V
   b) allow charge pulse if no-load voltage response is below 1.65V, skip pulse if above
   c) continue pulse skipping until a total charge time of 12 or 24 hours is reached Although the charging method may be employed with any rechargeable alkaline manganese cell, the method is particularly advantageously applied to cells of the present invention. Due to the presence of the hydrophobic binder, which is electrochemically inactive and non-conductive, the capacity of the cells of the present invention is diminished at the outset as compared with the control. The present charging method allows more of the available capacity of the cells to be utilized, making the cells of the present invention indistinguishable in terms of performance from prior art cells charged with prior art charging methods.

Charging Method Comparison

The control and the cells according to the present invention were subjected to 25 discharge-charge cycles. Each cycle consisted of discharge using a 10 ohm resistive load to discharge the cells to a cut-off voltage of 0.9V followed by charging according to either the standard charge method or the new charge method. The standard charge method consisted of charging for 12 hours to a voltage limit of 1.65 V with an initial charge current of approx. 400 mA applied continuously. As the cell voltage increases, the actual charge current decreases and tapers off to almost zero as the 1.65 V limit is reached, hence this method is also referred to as 'taper' charge. The new charge method was according to the third embodiment, as described above, also conducted for 12 hours.

Table 3 shows the capacity of the $25^{th}$ cycle and the cumulative capacity over 25 cycles for all cells indicating the percentage changes of the different charge methods. The term cumulative capacity means the sum of all individual discharge capacities over the tested number of cycles. The given data represent the average of 4 cells per test in each group.

TABLE 3

Charging Method Comparison with Cycle Test at 10 Ohm Load

| Cell type | HA1681 | 25th Cycle [Ah] | | Performance | Cumulative 25 Cycles [Ah] | | Performance |
| --- | --- | --- | --- | --- | --- | --- | --- |
| | | Std. charge | New charge | Increase for New charge | Std. charge | New charge | Increase for New charge |
| Control | 0.00% | 0.94 | 1.00 | +6.38% | 26.10 | 31.15 | +19.35% |
| #1 | 0.10% | 0.86 | 0.92 | +6.98% | 26.40 | 31.00 | +17.42% |

From Table 3 it can be seen that for both types of cells the new charge method provides much improved cumulative performance over 25 cycles. Approximately 90% of the theoretical maximum charge capacity is reached with cells charged using the new charging method, as compared with a typical value of 75% for the standard charging method. The individual cycle capacity in the $25^{th}$ cycle is increased as well, indicating a lower capacity fade per cycle. The cumulative capacity of the cells according to the present invention charged with the new charging method surprisingly exceeds the cumulative capacity of the control cells charged using the prior art charging method, despite having less active cathode material due to the presence of the hydrophobic binder. The cell performance observed by the end-user is therefore actually superior for the cells of the present invention. Although the new charging method is particularly advantageously applied to cells of the present invention, it may also be advantageously applied to the control cells.

Cumulative Cell Performance

The addition of hydrophobic binder theoretically decreases the cumulative capacity and capacity of the $25^{th}$ cycle of the cells. The effect of hydrophobic binder addition was investigated using control cells and cells according to the present invention. Twenty-five discharge-charge cycles were conducted as described above. The discharge was performed using both a 10 ohm resistive load to a cut-off voltage of 0.9 V and a 3.9 ohm resistive load to a cut-off voltage of 0.8 V. The lower resistive load resulted in a higher discharge current. The cells were then recharged using the new charge method for a period of 12 hours. The results of these tests are compiled in Tables 4 and 5. The term cumulative capacity means the sum of all individual discharge capacities over the tested number of cycles. The data represents the average of 4 cells in each group.

TABLE 4

Comparison of Binder Amounts with Cycle Test at 10 Ohm Load

| Cell type | Coathylene ® HA1681 | 25th Cycle [Ah] | Change | Cumulative 25 Cycles [Ah] | Change |
|---|---|---|---|---|---|
| Control | 0.00% | 1.00 | 0.00% | 31.15 | 0.00% |
| #1 | 0.10% | 0.92 | −8.00% | 31.00 | −0.48% |
| #2 | 0.20% | 0.87 | −13.00% | 30.86 | −0.93% |

The presence of the hydrophobic polymer powder had only a negligible impact on cumulative cell capacity and only slightly decreased the capacity of the $25^{th}$ cycle. The decrease was more remarkable for cells #2 with a higher amount of Coathylene® HA1681.

TABLE 5

Comparison of Binder Amounts with Cycle Test at 3.9 Ohm Load

| Cell type | Coathylene ® HA1681 | 25th Cycle [Ah] | Change | Cumulative 25 Cycles [Ah] | Change |
|---|---|---|---|---|---|
| Control | 0.00% | 0.83 | 0.00% | 26.85 | 0.00% |
| #1 | 0.10% | 0.84 | +1.20% | 26.44 | −1.53% |
| #2 | 0.20% | 0.86 | +3.61% | 25.45 | −5.21% |

For a higher discharge current the presence of the hydrophobic polymer powder slightly increased the capacity in the $25^{th}$ cycle and only slightly decreased the cumulative capacity over 25 cycles. Again, the decrease was more remarkable for cells #2 for cells #2 with a higher amount of Coathylene® HA1681. The tendency demonstrated by these tests (i.e. that performance decreases with increased presence of the hydrophobic polymer powder) indicated that higher levels of polyethylene powder additive would be detrimental to cumulative cycle performance, although with small amounts the decrease in performance was still acceptable.

Other Hydrophobic Binders

Another suitable class of hydrophobic binders comprises a metal salt of a fatty acid. Examples of suitable fatty acids are stearic acid, margaric acid and palmitic acid. One particularly suitable fatty acid is stearic acid. Examples of metal salts of stearic acid are calcium stearate, magnesium stearate and zinc stearate. The hydrophobic binder calcium stearate has a chemical formula of $Ca[CH_3(CH_2)_{16}CO_2]_2$. This hydrophobic binder is particularly preferable, as it provides the hydrophobic characteristic from the —$(CH_2)$— fatty acid chain and also provides a calcium compound (a possible second hygroscopic additive in addition to barium and strontium).

To demonstrate the suitability of calcium stearate, test cells #3 were made with calcium stearate in an amount of 0.4% by weight of the cathode as the hydrophobic binder. The pellets produced did not exhibit any sticky consistency and could be continuously processed without pellet blockages or efficiency loss on automated equipment as previously described.

In order to study the effect of this hydrophobic binder on cumulative cell capacity, test cells #3 were subjected to 25 discharge-charge cycles using a 10 ohm resistive load to discharge the cells to a cut-off voltage of 0.9V and applying the new charging methodology as described above for 12 hours. The results for this test are compiled in Table 6. The term cumulative capacity means the sum of all individual discharge capacities over the tested number of cycles. The data represents the average of 4 cells in each group.

TABLE 6

Calcium Stearate Binder Cycle Test at 10 Ohm Load

| Cell type | CaStearate | 25th Cycle [Ah] | Change | Cumulative 25 Cycles [Ah] | Change |
|---|---|---|---|---|---|
| Control | 0.00% | 1.00 | 0.00% | 31.15 | 0.00% |
| #3 | 0.40% | 1.07 | +7.00% | 32.3 | +3.69% |

The hydrophobic calcium stearate powder increased the cumulative capacity and capacity of the $25^{th}$ cycle by 3.69% and 7.00%, respectively. The addition of 0.4% calcium sterate as hydrophobic binder did not decrease cumulative or $25^{th}$ cycle capacity, but surprisingly provided improved capacity. This is likely due to the presence of the calcium compound, which serves as a source for Ca ions and acts as an additional additive in the cathode mix.

In keeping with this concept, different fatty acids and different metal salt compounds, are deemed to be suitable. The fatty acids should be selected to have sufficient —$(CH)_2$- chains to provide sufficient hydrophobicity; typically 12 to 18 —$(CH)_2$- chains in the fatty acid formula are suitable candidates. Further additives that could solve the 'stickiness' problem would be from the group of hydrophobic polymer powders, such as polytetrafluoroethylene (Teflon®) and others. However, Teflon® powders are more costly than polyethylene and therefore less desirable.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features and sub-combinations. This is contemplated by and is within the scope of the claims.

Since many possible embodiments may be made of the invention without departing from the scope thereof, it is to be understood that all matter herein set forth is to be interpreted as illustrative and not in a limiting sense. Variations of the foregoing embodiments will be evident to a person of ordinary skill and are intended by the inventor to be encompassed by the following claims.

The invention claimed is:

1. A rechargeable closed alkaline manganese cell comprising:
   a. an aqueous electrolyte; and,
   b. a cathode pellet formed from a homogeneous blend of:
      i. a cathode powder comprising manganese dioxide;
      ii. an additive powder comprising fully hydrated strontium; and,
      iii. a hydrophobic binder comprising a polyethylene powder for altering consistency of the pellet, the hydrophobic binder in an amount of greater than zero and less than 0.5% by total weight of the cathode pellet.

2. The cell according to claim 1, wherein the hydrophobic binder is present in an amount of from 0.01% to 0.25% by weight of the cathode.

3. The cell according to claim 2, wherein the hydrophobic binder is present in an amount of from about 0.1% to about 0.2% by weight of the cathode.

4. The cell according to claim 1, wherein the hydrophobic binder is in an amount of from 0.001% to 0.4% by weight of the cathode.

5. The cell according to claim 4, wherein the hydrophobic binder is in an amount of from 0.01% to 0.25% by weight of the cathode.

6. The cell according to claim 5, wherein the hydrophobic binder is in an amount of from 0.1% to 0.2% by weight of the cathode.

7. The cell according to claim 1, wherein the hydrophobic binder is provided in a powdered form with a particle size of less than 75 μm.

8. The cell according to claim 7, wherein the hydrophobic binder has a particle size of from 10 to 20 μm.

* * * * *